(12) United States Patent
Tezuka et al.

(10) Patent No.: US 10,503,141 B2
(45) Date of Patent: Dec. 10, 2019

(54) DISPLAY DEVICE AND MACHINING SYSTEM FOR OSCILLATION CUTTING

(71) Applicant: FANUC CORPORATION, Yamanashi (JP)

(72) Inventors: Junichi Tezuka, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 32 days.

(21) Appl. No.: 15/977,508

(22) Filed: May 11, 2018

(65) Prior Publication Data

US 2018/0335765 A1 Nov. 22, 2018

(30) Foreign Application Priority Data

May 16, 2017 (JP) .................................. 2017-097269

(51) Int. Cl.
*G05B 19/404* (2006.01)
*B23B 29/12* (2006.01)
*B23B 27/22* (2006.01)
*G05B 19/4093* (2006.01)

(52) U.S. Cl.
CPC .......... *G05B 19/404* (2013.01); *B23B 29/125* (2013.01); *G05B 19/40938* (2013.01); *B23B 27/22* (2013.01); *G05B 2219/31472* (2013.01); *G05B 2219/49277* (2013.01)

(58) Field of Classification Search
USPC .................................................... 318/568.1
See application file for complete search history.

(56) References Cited

U.S. PATENT DOCUMENTS

| 5,162,708 A * | 11/1992 | Naito | H02N 2/14 310/316.02 |
| 8,439,839 B2 * | 5/2013 | Kadokura | A61B 5/02007 600/407 |
| 9,791,846 B2 * | 10/2017 | Watanabe | G05B 19/4103 |

(Continued)

FOREIGN PATENT DOCUMENTS

| JP | 2006172149 A | 6/2006 |
| JP | 2006-312223 A | 11/2006 |

(Continued)

*Primary Examiner* — Jorge L Carrasquillo
(74) *Attorney, Agent, or Firm* — Hauptman Ham, LLP

(57) ABSTRACT

A display device includes a position information acquisition part, a rotation information acquisition part, a first waveform generation part, a second waveform generation part, and a waveform display part, which displays plural second waveform data. The position information acquisition part acquires position information of a feed axis. The rotation information acquisition part acquires the rotation speed of a workpiece as rotation information of a spindle. The first waveform generation part generates first waveform data representing a change of the position information over time from time series position information of the feed axis. The second waveform generation part generates plural second waveform data by obtaining a time per rotation from the rotation speed, dividing the first waveform data into partial waveform data for time per rotation, and sequentially shifting each partial waveform data in the time axis direction so as to match a start point of the first waveform data.

12 Claims, 4 Drawing Sheets

(56) References Cited

U.S. PATENT DOCUMENTS

| | | | | |
|---|---|---|---|---|
| 2005/0113959 A1* | 5/2005 | Kajiyama | ............ | G05B 19/414 |
| | | | | 700/181 |
| 2008/0037600 A1* | 2/2008 | Ma | ........................ | G02F 1/3501 |
| | | | | 372/21 |
| 2016/0266567 A1* | 9/2016 | Watanabe | ............ | B23Q 15/013 |

FOREIGN PATENT DOCUMENTS

| | | | |
|---|---|---|---|
| JP | 5033929 | B1 | 9/2012 |
| JP | 5139592 | B1 | 2/2013 |
| JP | 5599523 | B1 | 10/2014 |
| JP | 6001720 | B1 | 9/2016 |
| WO | 2015/146945 | A1 | 10/2015 |
| WO | 2016/067372 | A1 | 5/2016 |
| WO | 2016/148116 | A1 | 9/2016 |
| WO | 2016047485 | A1 | 10/2016 |

\* cited by examiner

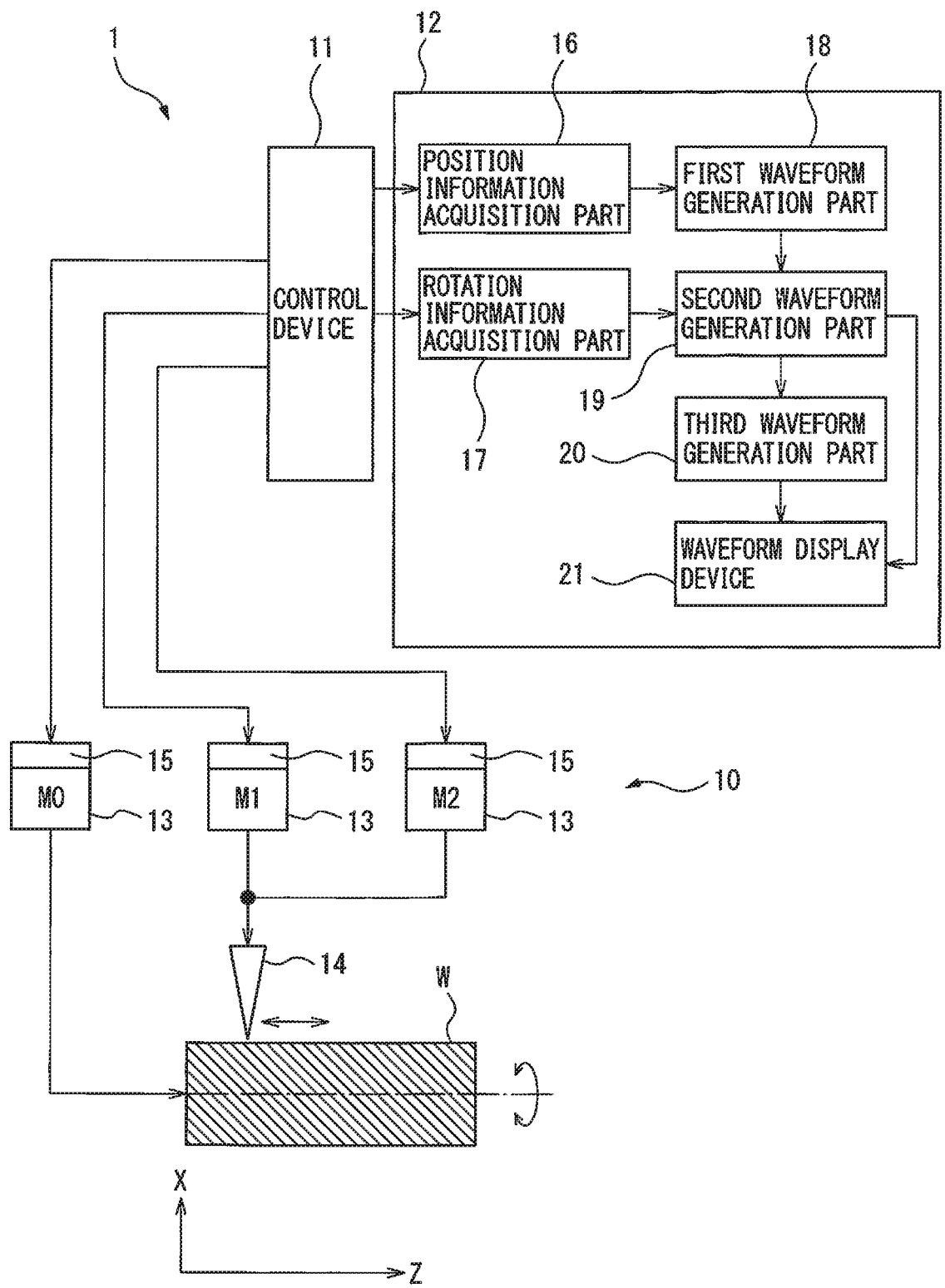

DISPLAY DEVICE AND MACHINING SYSTEM FOR OSCILLATION CUTTING

RELATED APPLICATIONS

The present application claims priority to Japanese Application Number 2017-097269, filed on May 16, 2017, the disclosure of which is hereby incorporated by reference herein in its entirety.

BACKGROUND OF THE INVENTION

1. Field of the Invention

The present invention relates to a display device for a machine tool which performs machining on a workpiece through cooperation of a spindle and feed axes, and specifically, relates to a display device and machining system for oscillation cutting.

2. Description of the Related Art

When swarf is continuously generated during the machining of a workpiece using the cutting tool of a machine tool, the swarf may become entangled with the cutting tool. In such a case, it is necessary to stop the machine tool in order to remove the swarf from the cutting tool, which is time consuming and reduces production efficiency. Further, there is a risk that the workpiece may be damaged by the swarf, reducing the quality of the workpiece.

In order to avoid such drawbacks, oscillation cutting, in which swarf is shredded by oscillating the cutting tool relative to the workpiece in the machining feed direction, is known. (refer to, for example, Japanese Patent No. 5033929 or Japanese Patent No. 5599523). In. the control device of the machine tool which performs oscillation cutting, by inputting a sinusoidal oscillation command to the servomotor of the feed axes which feeds the cutting tool or workpiece in the machining direction, the cutting tool and workpiece are relatively oscillated in the machining direction.

Furthermore, conventionally, a waveform display device capable of displaying waveforms such as command data generated by a numerical control device (CNC) in accordance with a machining program and which is instructed to the servo motor of each axis of a machine tool, and actual position data outputted from a position detector provided for each axis is known (for example, Japanese Patent no. 6001720).

SUMMARY OF THE INVENTION

In order to shred swarf as intended in the above-mentioned oscillation cutting, it is necessary to determine the frequency, amplitude, etc., of the feed command for periodically oscillating the tool or the workpiece in the machining direction of the workpiece by feed axes in advance. Typically, in the number control device of machine tools, an NC program capable of setting machining conditions such as the spindle rotation speed and the feed speed and various parameters is created and stored, and the feed command of the above oscillation operations is generated in accordance with the NC program. Thus, an operator can change the machining conditions and the various parameters set in the NC program in the numerical control device to determine the frequency, amplitude, etc., of the feed command for the oscillation operations.

In such operations, it is desirable to be able to check how the command data and actual position data of the feed axes performing the oscillation operations change in accordance with changes in the machining conditions and the various parameters set in the NC program in the numerical control device. Thus, a waveform display device as described above is useful.

However, there is a problem in that it is difficult to determine whether the shredding of swarf by the tool is possible merely by display tag the waveform of the time change of command data or actual position data regarding the feed axes performing oscillation operation. Thus, it is desired that the operator be able to visually and easily determine whether the shredding of swarf in oscillation cutting is possible.

A one aspect of the present disclosure provides a display device for displaying information related to a machine tool when performing intermittent cutting by oscillating a tool and a workpiece relative to each other in a machining feed direction in order to shred swarf generated when machining is performed, the machine tool performing machining through cooperation of a spindle for performing a relative rotation between the workpiece and the tool around a central axis of the workpiece, and a feed axis for performing a relative feeding between the tool and the workpiece in the machining feed direction, the display device comprising:

a position information acquisition part which acquires position information of the feed axis at predetermined intervals when intermittent cutting is performed;

a rotation information acquisition part which acquires a rotation speed of the spindle as rotation information of the spindle when intermittent cutting is performed;

a first waveform generation part which generates first waveform data representing a change of the position information over time from time series position information of the feed axis acquired by the position information acquisition part at the predetermined intervals;

a second waveform generation part which generates a plurality of second waveform data by obtaining a rotation time per rotation from the rotation speed acquired by the rotation information acquisition part, dividing the first waveform data into partial waveform data for time per rotation, and sequentially shifting each partial waveform data in the time axis direction so as to match a start point of the first waveform data; and a waveform display part which displays the plurality of second waveform data.

Furthermore, another aspect of the present disclosure provides a display device for displaying information related to a machine tool when performing intermittent cutting by oscillating a tool and a workpiece relative to each other in a machining feed direction in order to shred swarf generated when machining is performed, the machine tool performing machining through cooperation of a spindle for performing a relative rotation between the workpiece and the tool around a central axis of the workpiece, and a feed axis for performing a relative feeding between the tool and the workpiece in the machining feed direction, the display device comprising:

a position information acquisition part which acquires position information of the feed axis at predetermined intervals when intermittent cutting is performed;

a rotation information acquisition part which acquires a rotation speed of the spindle as rotation information of the spindle when intermittent cutting is performed;

a first waveform generation part which generates first waveform data representing a change of the position information from time series position information of the feed axis acquired by the position information acquisition part at the predetermined intervals according to rotation angle;

a second waveform generation part which generates a plurality of second waveform data by dividing the first waveform data into partial waveform data by rotation angle per rotation and sequentially shifting each partial waveform data so as to match a start point of the first waveform data; and a waveform display part which displays the plurality of second waveform data.

According to the above aspects, the display device provided in the control device of the machine tool that performs oscillation cutting makes it easy for an operator to visually determine whether or not the shredding of swarf in oscillation cutting is possible.

The objects, features and advantages of the present invention, as well as other objects, features and advantages will be further clarified from the detailed description of the representative embodiments of the present disclosure as shown in the accompanying drawings.

BRIEF DESCRIPTION. OF THE DRAWINGS

FIG. 1 is a view of a machining system including a display device of an embodiment.

DETAILED DESCRIPTION

Figure 2A:
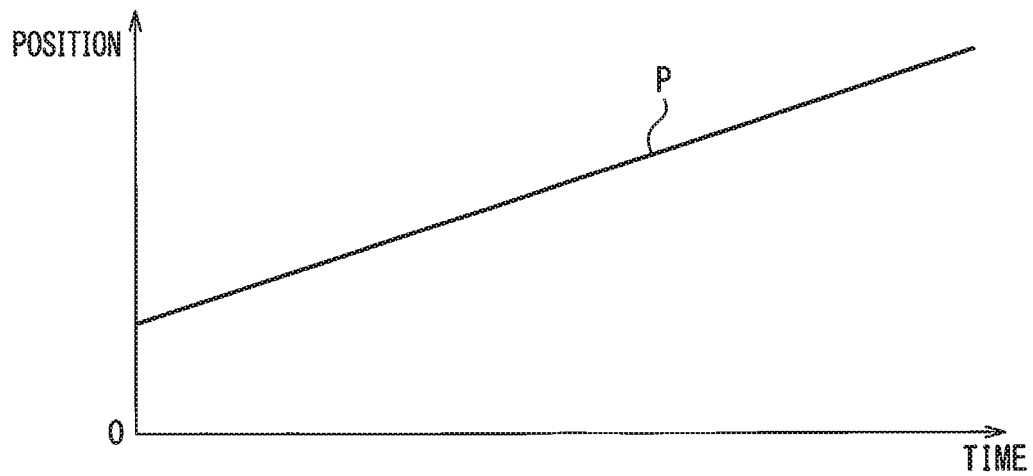
FIG. 2A is a drawing showing a position command for the feed axes obtained by the control device shown in FIG. 1.

The embodiments of the present disclosure will be described with reference to the drawings. In the referenced drawings, the same components or functional elements are given the same reference numerals. For the ease of understanding, the drawings have been appropriately modified in scale. Further, the embodiments shown in the drawings are only examples for carrying out the present invention, and the present invention is not limited to the illustrated embodiments.

FIG. 1 is a view of a machining system 1 including a display device 12 of an embodiment.

The machining system 1 comprises a machine tool 10, a control device 11 for controlling the machine tool 10, and a display device 12.

The machine tool 10 includes a tool 14, for example, a cutting tool. The tool 14 cuts a workpiece W having, for example, a cylindrical shape, a columnar shape, a conical shape, a frustoconical shape, or the like. The shape of the workpiece W may be a shape other than a cylindrical shape, and the machine tool 10 is not limited to tools that perform cutting, but may be tools that perform grinding, polishing, etc.

However, in the following description, as shown in FIG. 1, machining is performed by the tool 14 on the outer peripheral surface of a rotating cylindrical workpiece W. Furthermore, an example of a configuration in which the workpiece W rotates and the tool 14 oscillates along the generatrix of the outer peripheral surface of the workpiece W will be described.

The machine tool 10 includes a plurality of drive axis 13. Each of the drive axis 13 is controlled by a control device 11, such as a CNC (computer numerical controller) or a PLC (programmable logic controller). A machine tool 10 having three drive axes 13 is illustrated in FIG. 1. However, the number of drive axes 13 is not limited thereto, and the machine tool 10 can comprise the required number of drive axes.

The plurality of drive axes 13 includes a spindle M0 and at least two feed axes M1 and M2 which cooperate with the spindle M0. The spindle M0 includes a spindle motor or a servo motor. The feed axes M1 and M2 each include a feed mechanism, such as a ball screw mechanism or a linear slider, and a servo motor for driving the feed mechanism.

In FIG. 1, the center axis of the workpiece W, which is the rotation axis of the workpiece W, is defined as the Z axis, and the axis perpendicular to the Z axis is defined as the X axis. Further, the spindle M0 rotates the workpiece W about the center axis (Z axis) of the workpiece. The feed axis M1 can both move the tool 14 in a first direction along the Z axis direction (hereinafter referred to as the machining direction), and reciprocate, i.e., oscilate, the tool 14 in the first direction. The feed axis M2 can both move the tool 14 in a second direction along the X axis direction (i.e., the cutting direction) and reciprocate, i.e., oscillate, the tool 14 in the second direction.

When machining is performed on a cylindrical or columnar workpiece, the workpiece is rotated about the central axis (Z axis) of the workpiece, and the tool 14 is moved along the Z axis direction (the machining direction) only. In such a case, the feed axis M2 is essentially unnecessary.

When machining is performed on a workpiece the outer diameter of which varies along the Z axis direction, such as a conical or frustoconical workpiece, the workpiece W is rotated about the central axis (Z axis) of the workpiece, and the tool 14 is moved in a resultant direction of the X axis direction and the Z axis direction. In such a case, at least two feed axes M1 and M2 are required in order to move the tool 14 obliquely along the generatrix of the outer peripheral surface of the workpiece W. By controlling both the feed axis M1 and the feed axis M2, the tool 14 can be moved obliquely along the generatrix of the outer peripheral surface of the workpiece W.

In the control device 11, a machining program (NC program) capable of setting machining conditions, such as the spindle rotation speed (S) and the feed speed (F), and various parameters is generated and stored. The control device 11 includes a control board (not shown) which can change the machining conditions and various parameters stored in the machining program.

The control device 11 can generate commands for independently controlling each of the drive axes 13, such as the spindle M0, the feed axis M1, and the feed axis M2, in accordance with the machining program, and can send the commands to the respective drive axes 13, such as the spindle M0, the feed axis M1, and the feed axis M2. In the configuration of the example of FIG. 1 in which the workpiece W is rotated by the spindle M0, and the tool 14 is moved by the feed axes M1, M2, etc., the control device 11 sends a command of a predetermined rotation speed to the spindle M0 and sends a command of a predetermined target position to the feed axes M1, M2, etc.

The machining system 1 includes position detection devices 15 for detecting the position of each of the drive axes 13, such as the spindle M0, the feed axis M1, and the feed axis M2. In particular, in the configuration shown in FIG. 1 in which the workpiece W is rotated by the spindle M0, a sensor, such as a rotary encoder, which can detect the rotation position (angle) of the workpiece W can be used as the position detection device 15 for the spindle M0. A rotary encoder is also capable of detecting the rotation speed of the workpiece W. Furthermore, a sensor which is capable of detecting the position of the tool 14 in the machining direction of the workpiece W, for example, an encoder, can be used as the position detection device 15 for the feed axis M1 shown in FIG. 1. A sensor which is capable of detecting the position of the tool 14 in the above-described cutting direction, for example, an encoder, can be used as the position detection device 15 for the feed axis M2.

However, the position detection devices 15 for the feed axes M1 and M2 may be any devices as long as they can acquire the positions of the feed axes (the position of the tool 14 in the example of FIG. 1), and are not limited to the above described encoders. The position detection devices 15 of the feed axes M1 and M2 may be a position measuring device including, for example, a laser tracker or three-dimensional position sensor, arranged away from the drive axes 13.

The control device 11 controls each of the drive axes 13 so that the aforementioned command sent to each of the drive axes 13 coincides with the position data of each drive axis 13 fed back from the position detection devices 15 of the respective drive axes 13 to the control device 11.

Further, in order to shred the swarf produced as a result of machining, the control device 11 has the function of controlling the feed axis M1 so as to perform intermittent cutting by relatively oscillating the tool 14 and the workpiece W in the aforementioned first direction (the machining direction).

A feed command for the feed axis M1 for performing such intermittent cutting is also generated in accordance with the machining program by the control device 11. The operator can determine the frequency, amplitude, and the like of the feed command for intermittent cutting by changing the machining conditions and the various parameters using the control panel (not shown) of the control device 11.

Note that, the above intermittent cutting means that the tool 14 cuts the workpiece 51 while periodically contacting with and separating from the workpiece W, which is also referred to as oscillation cutting or vibration cutting.

The above-described feed command for intermittent cutting is generated by, for example, the following method. First, the control device 11 generates the position command for the feed axis M1 with respect to the movement in the first direction (machining direction) along the Z axis direction of FIG. 1 based on the machining start point, the machining end point, the rotation speed of the spindle M0 (the rotation speed of the workpiece W in the example of FIG. 1), the feed speed by the feed axis M1 (the feed speed of the tool 14 in the example of FIG. 1), and the like, which are set in the machining program. Then, the control device 11 generates the oscillation command for the feed axis M1 for generating oscillation (reciprocating motion) of the tool 14 in the above machining direction based on the above-described rotation speed, feed speed and various parameters. Further, the control device 11 adds the oscillation command to the position command to generate the aforementioned feed command (resultant command) for intermittent cutting.

FIG. 2A shows the aforementioned position command, wherein the horizontal axis represents time and the vertical axis represents the position (position command value) in the machining direction. In the position command, the position command value of the feed axis M1 linearly increases with time (refer to straight line P).

Figure 2B:
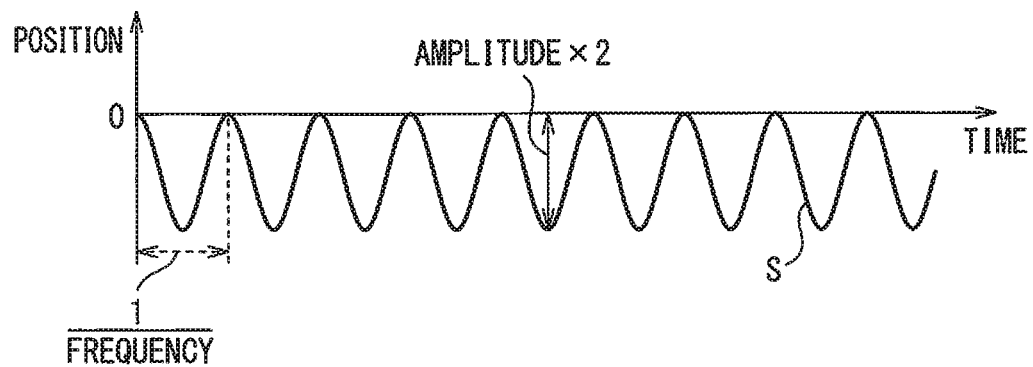
FIG. 2B is a drawing showing an oscillation command for the feed axes obtained by the control device shown in FIG. 1.

FIG. 2B shows the aforementioned oscillation command, wherein the horizontal axis represents time and the vertical axis represents the position (position command value) in the machining direction. In the oscillation command, the position command value of the feed axis M1 periodically increases and decreases over time (refer to wavy curve S). As can be understood from FIG. 2B, various vibration waveforms of oscillation commands can be obtained by changing the amplitude and frequency of the oscillation command. Note that, in this example, since the rotation speed of the workpiece W and the feed speed of the tool 14 are set to constant values, both the frequency and the amplitude of the oscillation command are constant values, regardless of passage of time.

Figure 2C:
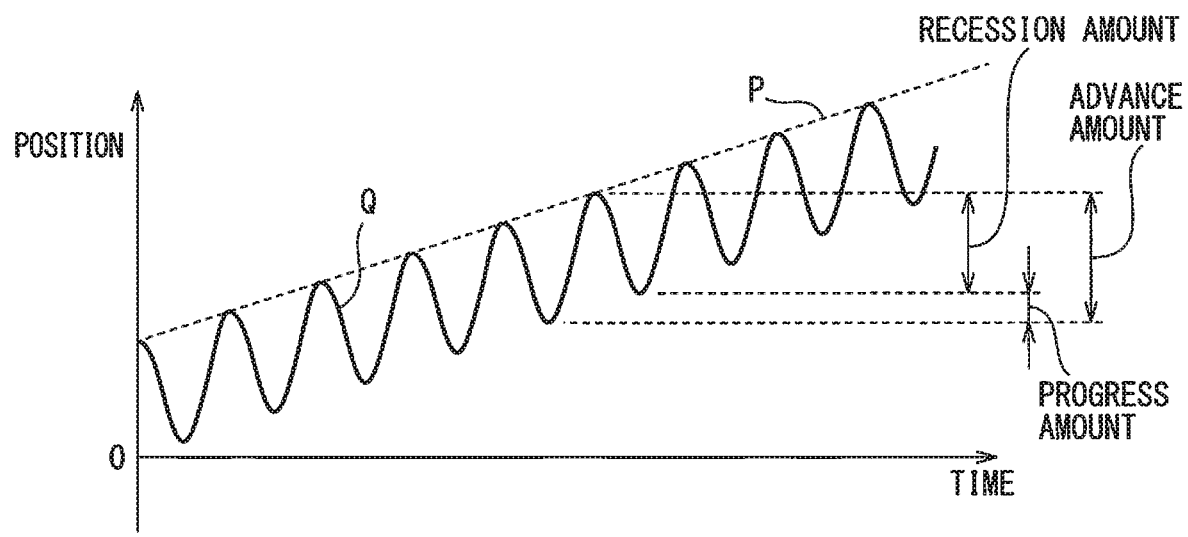
FIG. 2C is a drawing showing a feed command obtained by adding the oscillation command shown in FIG. 2B to the position command shown in FIG. 2A.

FIG. 2C shows a feed command (resultant command) obtained by adding the oscillation command shown in FIG. 2B to the position command shown in FIG. 2A, wherein the horizontal axis represents time and the vertical axis represents the position (position command value) in the machining direction. The trajectory of the tool 14 follows the feed command shown in FIG. 2C. More specifically, as shown in FIG. 2C, in accordance with the feed command (refer to the wavy curve Q), in one reciprocation, the tool 14 moves forward by a predetermined forward movement amount after moving backward by a predetermined backwards movement amount, and advances by the amount corresponding to the difference therebetween. In the present embodiment, intermittent cutting is performed by feeding the tool 14 in the machining direction while oscillating in the machining direction using the feed axis M1.

The aforementioned oscillation command is a cosine wave command, as shown by the wavy curve S in FIG. 2B, and is defined as follows.

$$\text{Oscillation command} = (K \times F/2) \times \cos(2\pi \times S/60 \times I \times t) - (K \times F/2) \quad \text{Formula (1)}$$

In Formula (1), K is the oscillation amplitude magnification, F is the movement amount of the tool 14 per rotation of the workpiece W, i.e., the feed amount per rotation [mm/rev], S is the rotation speed [min$^{-1}$], or [rpm] of workpiece W around the center axis, and I is the oscillation frequency magnification. The oscillation frequency, i.e., the frequency of the oscillation command, corresponds to the expression S/60×I in Formula (1), and the oscillation amplitude, i.e., the amplitude of the oscillation command, corresponds to the expression K×F/2 in Formula (1). The oscillation amplitude magnification K is an integer of 1 or more, and the oscillation frequency magnification I is a non-integer larger than zero (for example, a positive non-integer such as 0.5, 0.8, 1.2, 1.5, 1.9, 2.3, or 2.5, . . . , etc.). The oscillation amplitude magnification K and the oscillation frequency magnification I are constants.

According to the above Formula (1), the oscillation command is a command in which the expression (K×F/2) is subtracted as an offset value from the cosine wave using the zero position as a reference axis. Thus, the feed command (wavy curve Q in FIG. 2C) obtained by adding the oscillation command to the position command becomes a command that does not exceed the position command (the straight line in FIG. 2C) in the machining direction. As a result, the positional trajectory of the tool 14 based on the feed command (wavy curve Q) can be controlled with the position by the position command as the upper limit in the machining direction of the tool 14.

Further, using an oscillation command as represented by Formula (1), large oscillation commands are not issued from the start in the feed direction of the tool 14 at the machining start point (0 degrees on the horizontal axis) of the tool 14, as can be seen from the wavy curve Q in FIG. 2C.

The reason why the oscillation frequency magnification I is not an integer is that in the case of an oscillation frequency which is exactly the same as the number of revolutions of the workpiece W around the center axis, it is impossible to generate the overlapping portions B1, B2, and the like (refer to FIG. 3), as described later, and an effect of shredding swarf through oscillation cutting cannot be obtained.

The above Formula (1) is described in the machining program in the control device 11. The control panel (not shown) of the machine tool 10 provides the respective values of the oscillation amplitude magnification K and the oscillation frequency magnification I to Formula (1) described in the machining program in the control device 11. The rotation speed S [min$^{-1}$] of workpiece W and the feed speed [mm/min] of the tool 14 are set in advance as machining conditions in the machining program in control device 11.

The control device 11 calculates the feed amount F per rotation (=feed speed F/rotation speed S) in the above Formula (1) from the feed speed and rotation speed, and can calculate the oscillation command in accordance with the above Formula (1) in which each value of the oscillation amplitude magnification K and the oscillation frequency magnification I has been inserted in advance.

In order to shred the swarf produced by machining, the machining system 1 of the present embodiment includes a display device 12 for displaying information on the machine tool 10 when performing intermittent cutting by relatively oscillating the tool 14 and the workpiece W.

As described above, the feed command for the feed axis M1 for performing intermittent cutting is generated by the control device 11, and the display device 12 is a device which enables the operator to visually confirm such a feed command and the actual position of the feed axis M1 driven by the feed command.

However, in a method of simply displaying the command value of the feed command for intermittent cutting on the display screen, it is difficult for the operator to determine from the display screen whether or not the shredding of swarf by tool 14 is possible. In the method in which the actual position of feed axis M1 driven by the feed command for intermittent cutting is detected by the position detection device 15, and the detection value is displayed on the display screen, it is also difficult for the operator to determine whether the swarf will be shredded from the display screen.

The display device 12 of the present embodiment, as shown in FIG. 1, includes a position information acquisition part 16, a rotation information acquisition part 17, a first waveform generation part 18, a second waveform generation part 19, a third waveform generation part 20, and a waveform display part 21.

In the configuration example shown in FIG. 1, the display device 12 is located remotely outside the control device 12. The display device 12 may be provided in the control panel (not shown) of the machine tool 10, or the display device 12 may be integrally formed with the control device 11. The waveform display part 21 may be a display panel part such as an LCD (liquid crystal display) panel or an OLED (organic light emitting diode) panel.

The position information acquisition part 16 obtains the position information of the feed axis M1 at predetermined intervals during intermittent cutting. This predetermined interval can be, for example, an integral multiple of the sampling cycle period of the control device 11 (e.g., the distribution period of the command pulse). Furthermore, the position information obtained by the position information acquisition part 16 is one of either the value of the feed command for intermittent cutting or the actual position of the feed axis M1 driven by the feed command.

Further, when the actual position of the feed axis M1 is obtained as the position information of the feed axis M1, the actual position may be the output value of an encoder provided on the servo motor for the feed axis M1, or may be the position of the moving end of the feed axis M1, for example, the position of the tip portion of the tool 14, remotely measured by a position measuring device such as a laser tracker or a three dimensional position sensor. The position information acquisition part 16 also has the function of storing the obtained time series position information of the feed axis M1 in a memory (not shown) in the display device 12.

The rotation information acquisition part 17 obtains the relative rotation speed and the rotation angle of the workpiece W and the tool 14 as rotation information. In the case of the configuration shown in FIG. 1, the rotation speed of the spindle M0 (the rotation speed of the workpiece W) is set in advance in the machining program stored in the control device 11, and the rotation information acquisition part. 17 obtains the rotation speed of the spindle M0 as the rotation information from the control device 11. Further, a rotary encoder is used as the aforementioned position detection device 15 for the spindle M0, and the control device 11 can detect the rotation angle of the spindle M0 using the rotary encoder during intermittent cutting. Thus, the rotation information acquisition part 17 can acquire the rotation. speed and rotation angle of the spindle M0 as the rotation information from the control device 11.

The first waveform generation part 18 generates first waveform data representing a change over time in the time series position information from the time series position information of the feed axis M1 acquired by the position information acquisition part 16 at the above-described predetermined intervals. For example, when acquiring a feed command for intermittent cutting using the position information acquisition part 16, the wavy curve Q as shown in FIG. 2C corresponds to the first waveform data.

The generated first waveform data may be the output value of the encoder mounted on the servomotor of the feed axis M1 per time or the position of the tip of the tool 14 per time remotely measured by the position measuring device. That is, the first waveform data may be waveform data based on the position command value for the feed axis M1 or may be waveform data based on the actual position of the feed axis M1.

The second waveform generation part 19 obtains the time per rotation based on the rotation speed acquired by the rotation information acquisition part 17. When the rotation speed is S [min$^{-1}$] and the oscillation frequency magnification is I, since the frequency can be expressed as S×60×I, the time $T_R$ [sec] per rotation is obtained from 1/S×60×I.

Further, the second waveform generation part 19 divides the first waveform data generated by the first waveform generation part 18 into partial waveform data for each time per rotation $T_R$, and sequentially shifts each partial waveform data in the time axis direction so as to match the origin (start point) on the time axis of the first waveform data, thereby generating a plurality of second waveform data.

The waveform display part 21 displays the plurality of second waveform data generated by the second waveform generation part 19.

Figure 3:
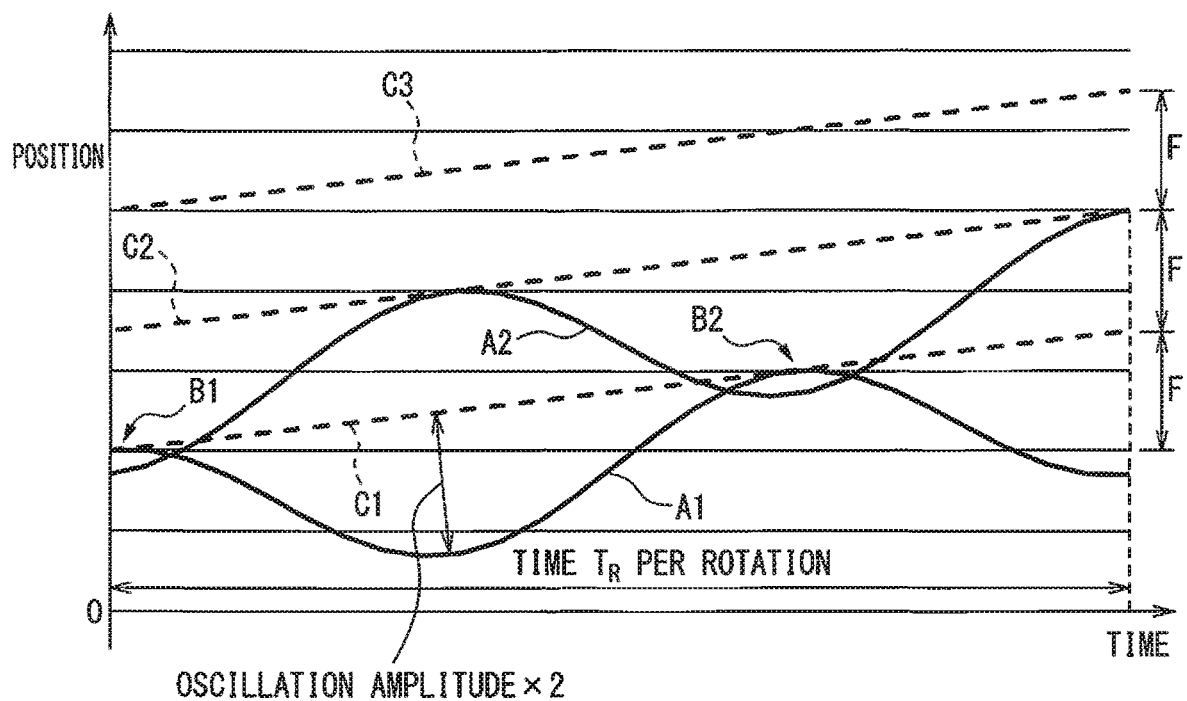
FIG. 3 is a drawing showing an example of second waveform data displayed on a waveform display part.

FIG. 3 is a drawing showing an example of second waveform data displayed by the waveform display part 21. In FIG. 3, the horizonal axis represents time, and the vertical axis represents the position in the machining direction (i.e., a first direction along the Z axis direction in FIG. 1).

Curve A1 and curve A2 shown in FIG. 3 correspond to, for example, partial waveform data obtained by dividing the time series data (wavy curve Q) of the feed command shown in FIG. 2C for time $T_R$ per rotation of the workpiece W, i.e., the second waveform data. FIG. 3 shows an example in which the above-mentioned time period $T_R$ is obtained when the oscillation frequency multiplication factor I is set to 1.5. Furthermore, curve A1 represents the second waveform data at the first rotation of workpiece W and curve A2 represents the second waveform data at the second rotation of workpiece W. For the sake of simplicity, illustration of the second waveform data after the third rotation of workpiece W has been omitted. The second waveform data such as these curves A1, A2, etc., represent the trajectory of the tool 14 on the workpiece W which is rotated.

Furthermore, in FIG. 3, a plurality of linear dashed lines C1, C2, C3 . . . extending in the oblique direction are shown. Each of the dashed lines C1, C2 and C3 corresponds to the position command (straight line P indicated by a dashed line) shown in FIG. 2C, and the intervals between the dashed lines C1, C2 and C3 in the vertical axis direction in FIG. 3 correspond to the rotation amount F per rotation. Thus, when displaying each second waveform data such as curves A1, A2, etc., On the waveform display part 21, it is preferable to also display dashed lines C1, C2 and C3 representing the position command.

According to FIG. 3, curve A1 and curve A2 overlap with each other at two portions B1 and B2. The maximum values of curve A1 with respect to dashed line C1 are larger than the minimum values of curve A2 with respect to dashed line C2 at portions B1 and B2.

At the overlapping portions B1 and B2, since the tool 14 separates from the workpiece W when the tool 14 is machining with the trajectory of curve A2, the workpiece W is not machined. Since such overlapping portions B1 and B2 are periodically generated, the aforementioned intermittent cutting can be performed. In the example shown in FIG. 3, swarf is generated at each of portions B1 and B2 by the operation according to curve A2. Namely, in the second rotation curve A2, swarf is generated twice.

Thus, by checking the presence of portions B1 and B2 at which the prior curve A1 and the subsequent curve A2 partially overlap each other using the waveform display part 21 of the display device 12, the operator can determine whether the shredding of swarf is possible. When there are no overlapping portions B1, B2, etc., the operator changes the oscillation frequency and the oscillation amplitude of the oscillation command shown in FIG. 2B. This change can be made by adjusting the set value on the machining program in the control device 11, for example, the rotation speed S of the spindle, the feed amount F per rotation, the oscillation frequency magnification I, etc. The operator should change the oscillation frequency or oscillation amplitude while viewing the waveform display part 21 of the display device 12 so that the intended overlapping portions B1 and B2 are generated.

Further, the display device 12 of the present embodiment can also include a third waveform generation part 20 as shown in FIG. 1. The third waveform generation part 20 generates third waveform data by subtracting $n^{th}$ second waveform data (where n is a non negative integer) from $(n+1)^{th}$ second waveform data, regarding each of the $n^{th}$ and $(n+1)^{th}$ waveform data obtained by dividing and shifting the first waveform data for time $T_R$ per rotation. The waveform display part 21 can display the third waveform data generated by the third waveform generation part 20 instead of the plurality of second waveform data.

Figure 4:
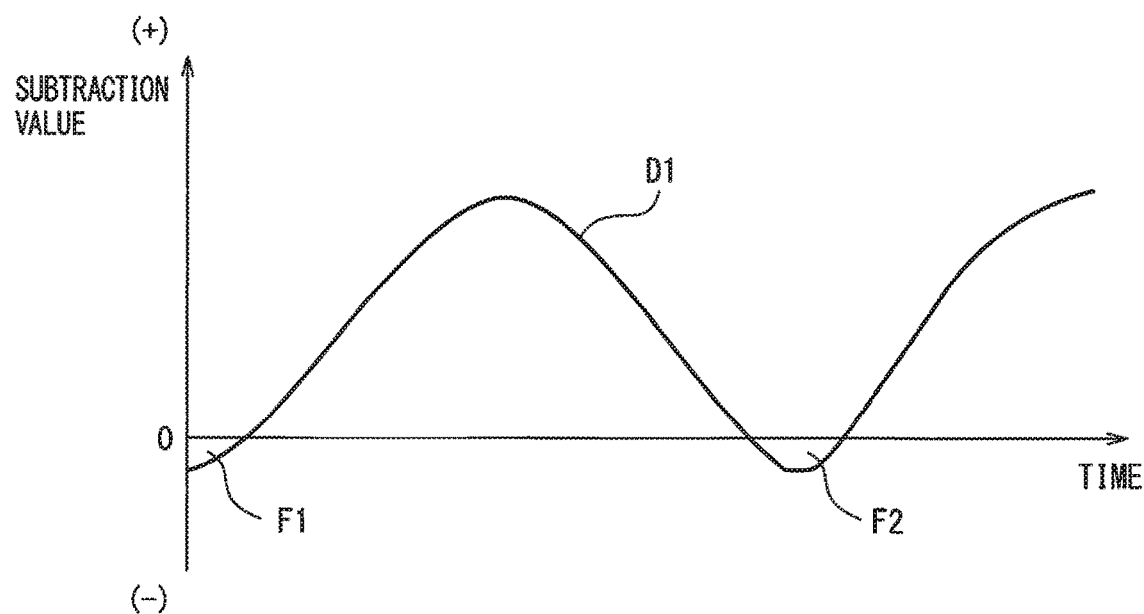
FIG. 4 is a drawing showing an example of third waveform data displayed on the waveform display part.

FIG. 4 is a drawing showing an example of third waveform data displayed on the waveform display part 21. In FIG. 4, the horizontal axis represents time and the vertical axis represents a subtraction value, i.e., the value obtained by subtracting $n^{th}$ second waveform data from $(n+1)^{th}$ second waveform data. For example, when the second waveform data of curve A1 is subtracted from the second waveform data of curve A2 shown in FIG. 3, third waveform data such as curve D1 shown in FIG. 4 is generated.

In FIG. 4, two portions F1 and F2 in which the subtraction value is displayed as a negative value correspond to the overlapping portions B1 and B2 in FIG. 3 described above. Thus, by checking the presence of portions F1 and F2 indicating such a negative subtraction value using the waveform display part 21, the operator can determine whether it is possible for swarf to be shredded. According to this display method, it is easier for the operator to determine whether the shredding of swarf is possible than in the display method shown in FIG. 3.

According to the display device 12 explained above, the operator can easily determine whether swarf can be shredded in intermittent cutting (oscillation cutting). As a result, the operator can realize intermittent cutting to shred the swarf as intended.

When there is backlash in the drive mechanism portion of the tool 14 or when the rigidity of the drive mechanism portion is low, vibration may occur during intermittent cutting, and the positional accuracy of the tool 14 may not be stable. For example, even if the feed axis M1 is driven based on a feed command for intermittent cutting, the actual position of the tool 14 may not completely follow curves A1 and A2 shown in FIG. 3. Namely, even if a command value which indicates that swarf can be shredded is used, there is a risk that the shredding of swarf may not actually be performed as intended. In connection thereto, the present embodiment detects the change in the actual position of the feed axis M1 over time using the position detection device 15, such as an encoder, generates the second waveform data or third waveform data based on the detected data, and displays the same on the waveform display part 21 of the display device 12. Thus, by viewing such second waveform data or third waveform data based on the actual position of the feed axis M1, the operator can accurately determine whether or not the shredding of the swarf will actually be performed.

Note that, in the embodiment described above, the first waveform generation part 18 generates the first waveform data representing the change over time of the position information of the feed axis M1, but the present invention is not limited thereto. For example, the first waveform generation part 18 may generate, as the first waveform data, waveform data representing the change of the position information of the feed axis M1 according to the rotation angle of the spindle M0. Namely, the horizontal axis of the graph of the first waveform data shown in FIG. 2C may be changed to represent rotation angle instead of time. In such a case, the second waveform generation part 19 may divide such first waveform data into partial waveform data for each rotation angle (360° or 2π) per rotation, and sequentially shift each partial waveform data so as to match the origin (starting point, i.e., zero) on the horizontal axis to thereby generate a plurality of second waveform data. Further, the third waveform generation part 20 may be configured to subtract $n^{th}$ second waveform data from $(n+1)^{th}$ second waveform data to generate third waveform data.

Figure 5:
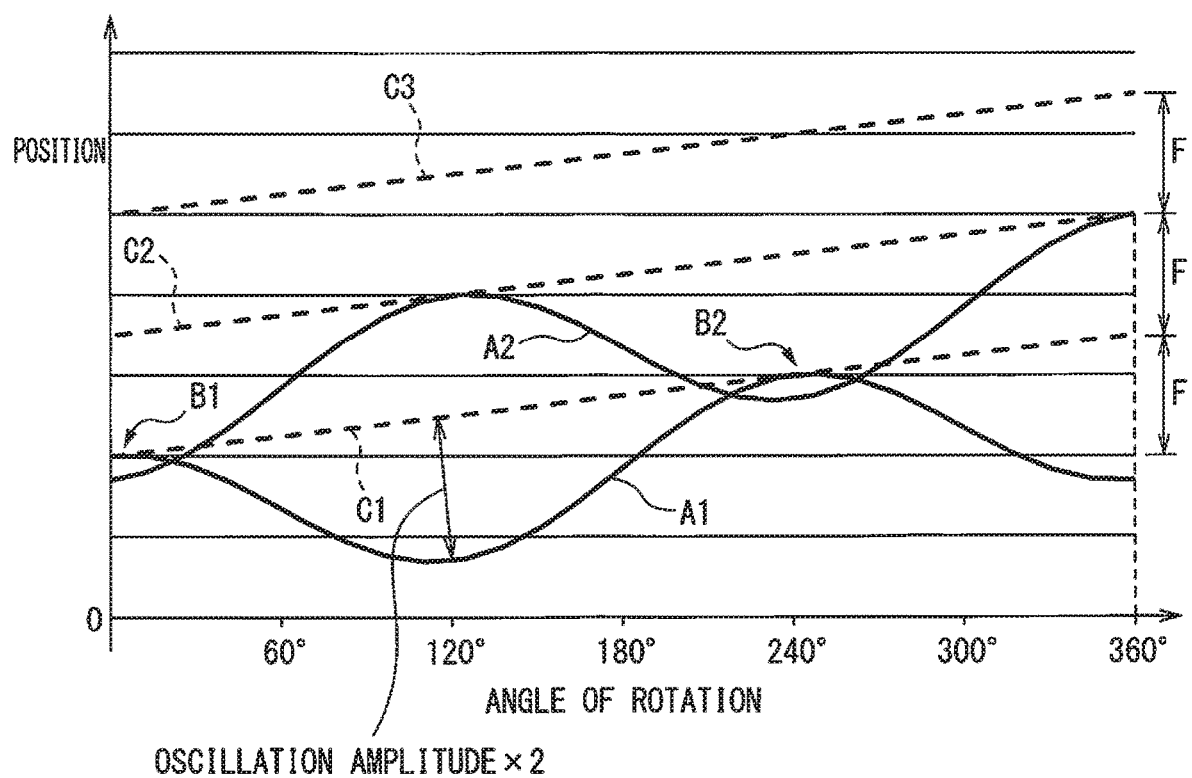
FIG. 5 is a drawing in which the horizontal axis of FIG. 3 represents the angle of rotation instead of time.

In short, in the examples of FIGS. 3 and 4, the horizontal axis represents time, but the horizontal axis may represent rotation angle. For example, FIG. 5 shows a drawing in which the horizontal axis in FIG. 3 represents the rotation angle instead of time.

When the time is t [s] and the rotation angular velocity of the workpiece W is $\omega$ [rad/s], the rotation angle $\theta$ [rad] of the workpiece W can be expressed by the equation $\theta=\omega \cdot t$. When the rotation speed of the workpiece W is S $[\min^{-1}]$ and the frequency magnification is I, the rotation angular velocity $\omega$ can be expressed by the equation $\omega=2\pi \times S/60 \times I$. Thus, the rotation angle $\theta$ is obtained from the rotation speed S, the time t, and the frequency magnification I. Since the rotation information acquisition part 17 acquires the rotation speed S of the spindle M0 from the control device 11 as rotation information, the second waveform generation part 19 can convert the second waveform data according to the time t into second waveform data according to the rotation angle $\theta$ based on the rotation speed S, the time t, and the frequency magnification I. Further, the third waveform generation part 20 can generate the third waveform data according to the rotation angle $\theta$ based on the second waveform data according to the rotation angle $\theta$.

As described above, though the rotation angle of the workpiece W may be calculated from the rotation speed S, which is the value set in the machining program in the control device 11, the rotation angle of the workpiece W may be actually detected by the rotary encoder mounted on spindle M0. The display device 12 may generate first waveform data in which the actual rotation angle and the position information of the feed axis M1 are associated with each other by detecting the rotation angle of the workpiece W and acquiring the position information of the feed axis M1 at the same predetermined intervals. The display device 12 may generate the second waveform data or the third waveform data according to the actual rotation angle from such first waveform data.

Further, when displaying the second waveform data or the third waveform data on the waveform display part 21, instead of the display method shown in FIGS. 3 and 4, the time or rotation angle may be indicated in the vertical axis direction and the position command value or actual position of the feed axis may be indicated in the horizontal axis direction.

In the above description, since the display device 12 in which machining is performed on a cylindrical workpiece W has been described as an example, the waveforms shown in FIGS. 2B, 2C, 3 and 4 are waveforms in which the rotation speed S of the workpiece W is a constant value. However, when machining is performed on a workpiece having a conical shape or a truncated conical shape, the diameter of the portion of the workpiece where the tip of the tool 14 contacts changes in accordance with the feed position of the tool 14 in the machining direction (the direction along the Z axis direction in FIG. 1). In this case, if the rotation speed S of the workpiece W is a constant value, the circumferential speed (that is, the cutting speed) of the contact portion of the tool on the workpiece changes depending on the position of tool 14 in the machining direction, and there is a risk that a homogeneously machined surface cannot be obtained. Thus, the rotation speed S of the workpiece W may be determined by a function that changes in accordance with the diameter of the portion of the workpiece where the tip of the tool 14 contacts so that the above circumferential speed becomes constant.

Furthermore, the aforementioned control device 11 and display device 12 are configured using a computer having a memory such as ROM (read-only memory) and RAM (random access memory), a CPU (central processing unit), and a communication control unit connected to each other via buses. Further, each of the functional components which compose the display device 12, such as the position information acquisition part 16, the rotation information acquisition part 17, the first waveform generation part 18, the second waveform generation part 19, and the third waveform generation part 20, can be achieved through cooperation of the CPU, the memory, and the control program stored in the memory installed in the above-described computer.

Although the present invention has been described with reference to exemplary embodiments, a person skilled in the art would understand that the above-described modifications of the embodiments and various other modifications, omissions, and additions can be made without departing from the scope of the present invention.

For example, in the embodiment described above, the workpiece W rotates and the tool 14 oscillates along the generatrix of the outer peripheral surface of the workpiece W. However, the present invention is not limited thereto.

The machine tool according to the present invention may be configured to perform machining on a workpiece W by controlling a spindle M0 which relatively rotates the workpiece W and the tool 14 around the central axis of the workpiece W, and at least one feed axis M1, M2 which relatively moves the workpiece H and the tool 14 in the machining direction of the central axis. For example, a configuration in which the tool 14 rotates about the central axis of the workpiece W and the workpiece W oscillates with respect to the tool 14, or a configuration in which the workpiece H rotates and the workpiece W oscillates relative to the tool 14 in the direction along the generatrix of the outer peripheral surface of workpiece W can be considered. In the present invention, the machining method in which the tool 14 rotates about the central axis of workpiece W and cuts workpiece W is also a type of machining.

Furthermore, in order to solve the at least one problem of the present disclosure, various embodiments and the effects thereof describe below can be provided.

The first aspect of time present disclosure provides a display device 12 for displaying information related to a machine tool 10 when performing intermittent cutting by oscillating a tool 14 and a workpiece W relative to each other in a machining feed direction in order to shred swarf generated when machining is performed, the machine tool 10 performing machining through cooperation of a spindle M0 for performing a relative rotation between the workpiece W and the tool 14 around a central axis of the workpiece W, and a feed axis M1, M2 for performing a relative feeding between the tool 14 and the workpiece W in the machining feed direction, the display device 12 comprising:

a position information acquisition part 16 which acquires position information of the feed axis M1, M2 at predetermined intervals when intermittent cutting is performed;

a rotation information acquisition part 17 which acquires a rotation speed of the spindle M0 as rotation information of the spindle M0 when intermittent cutting is performed;

a first waveform generation part 18 which generates first waveform data representing a change of the position information over time from time series position information of the feed axis M1, M2 acquired by the position information acquisition part 16 at the predetermined intervals;

a second waveform generation part 19 which generates a plurality of second waveform data by obtaining a rotation time per rotation from the rotation speed acquired by the rotation information acquisition part 17, dividing the first waveform data into partial waveform data for time per rotation, and sequentially shifting each partial waveform data in the time axis direction so as to match a start point of the first waveform data; and a waveform display part 21 which displays the plurality of second waveform data.

According to the above first aspect, the display device makes it easy for an operator to determine whether or not the shredding of swarf in intermittent cutting (oscillation cutting) is possible.

The second aspect of the present disclosure provides the display device 12 of the above first aspect, further comprising:

a third waveform generation part 20 which generates third waveform data by subtracting $n^{th}$ second waveform data (where n is a non-negative integer) from $(n+1)^{th}$ second waveform data, regarding each of the $n^{th}$ and $(n+1)^{th}$ waveform data obtained by dividing and shifting the first waveform data for time per rotation; wherein the waveform display part 21 displays the third waveform data instead of the plurality of second waveform data.

According to the above second aspect, it is easier for an operator to determine whether or not the shredding of swarf is possible, as compared to the case of displaying the second waveform data.

The third aspect of the present disclosure provides a display device 12 for displaying information related to a machine tool 10 when performing intermittent cutting by oscillating a tool 14 and a workpiece W relative to each other in a machining feed direction in order to shred swarf generated when machining is performed, the machine tool 10 performing machining through cooperation of a spindle M0 for performing a relative rotation between the workpiece 51 and the tool 14 around a central axis of the workpiece W, and a feed axis M1, M2 for performing a relative feeding between the tool 14 and the workpiece W in the machining feed direction, the display device 12 comprising:

a position information acquisition part 16 which acquires position information of the feed axis M1, M2 at predetermined intervals when intermittent cutting is performed;

a rotation information acquisition part 17 which acquires a rotation speed of the spindle M0 as rotation information of the spindle M0 when intermittent cutting is performed;

a first waveform generation part 18 which generates first waveform data representing a change of the position information from time series position information of the feed axis M1, M2 acquired by the position information acquisition part 16 at the predetermined intervals according to rotation angle;

a second waveform generation part 19 which generates a plurality of second waveform data by dividing the first waveform data into partial waveform data by rotation angle per rotation and sequentially shifting each partial waveform data so as to match a start point of the first waveform data; and a waveform display part 21 which displays the plurality of second waveform data.

According to the above third aspect, the same effects as the display device of the above first aspect can be obtained.

The fourth aspect of the present disclosure provides the display device 12, of the above third aspect, further comprising:

a third waveform generation part 20 which generates third waveform data by subtracting $n^{th}$ second waveform data (where n is a non-negative integer) from $(n+1)^{th}$ second waveform data, regarding each of the $n^{th}$ and $(n+1)^{th}$ waveform data obtained by dividing and shifting the first waveform data for each rotation angle per rotation; wherein the waveform display part displays the third waveform data instead of the plurality of second waveform data.

According to the above fourth aspect, the same effects as the display device of the above second aspect can be obtained.

The fifth aspect of the present disclosure provides the display device 12 of any of the above first aspect through the fourth aspect, wherein the position information acquisition part 16 acquires a feed command for the intermittent cutting applied to the feed axis M1, M2 or the position of the feed axis M1, M2 driven in accordance with the feed command as the position information of the feed axis M1, M2.

According to the above fifth aspect, the positions of the feed axes actually driven by the feed commands are acquired as the position information of the feed axes and the aforementioned second waveform data or the third waveform data is displayed based on this information. Thus, an operator can accurately determine from the displayed contents whether or not the shredding of swarf will actually be performed.

The sixth aspect of the present disclosure provides a machining system 1 comprising:

the display device 12 of any of the above first aspect through the fifth aspect, and a control device 11, in which the rotation speed and feed speed of the feed axis M1, M2 are stored in advance, the control device having a function of generating feed commands for the intermittent cutting which is provided to the feed axis M1, M2 based on the rotation speed and the feed speed.

The seventh aspect of the present disclosure provides the machining system 1 of the above sixth aspect, further comprising a position detection device 15 for detecting a position of the feed axis M1, M2 driven in accordance with the feed commands, wherein the position detection device 15 includes an encoder mounted the feed axis M1, M2 or a position measuring device for remotely measuring the position of the tool 14.

According to the above seventh embodiment, the position of the tool can be remotely measured by a position measuring device and the measured position of the tool can be obtained as position information of feed axes. Thus, an operator can determine whether or not the shredding of swarf is possible using more detailed information on the position of the tool.

The invention claimed is:

1. A display device for displaying information related to a machine tool when performing intermittent cutting by oscillating a tool and a workpiece relative to each other in a machining feed direction in order to shred swarf generated when machining is performed, the machine tool performing machining through cooperation of a spindle for performing a relative rotation between the workpiece and the tool around a central axis of the workpiece, and a feed axis for performing a relative feeding between the tool and the workpiece in the machining feed direction, the display device comprising:

a position information acquisition part which acquires position information of the feed axis at predetermined intervals when intermittent cutting is performed;

a rotation information acquisition part which acquires a rotation speed of the spindle as rotation information of the spindle when intermittent cutting is performed;

a first waveform generation part which generates first waveform data representing a change of the position information over time from time series position information of the feed axis acquired by the position information acquisition part at the predetermined intervals;

a second waveform generation part which generates a plurality of second waveform data by obtaining a rotation time per rotation from the rotation speed acquired by the rotation information acquisition part, dividing the first waveform data into partial waveform data for time per rotation, and sequentially shifting each partial waveform data in the time axis direction so as to match a start point of the first waveform data; and a waveform display part which displays the plurality of second waveform data, the display device further comprising:

a third waveform generation part which generates third waveform data by subtracting $n^{th}$ second waveform data (where n is a non-negative integer) from $(n+1)^{th}$ second waveform data, regarding each of the $n^{th}$ and $(n+1)^{th}$ waveform data obtained by dividing and shifting the first waveform data for time per rotation; wherein the waveform display part displays the third waveform data instead of the plurality of second waveform data.

2. The display device according to claim 1, wherein the position information acquisition part acquires a feed command for the intermittent cutting applied to the feed axis or the position of the feed axis driven in accordance with the feed command as the position information of the feed axis.

3. A machining system, comprising:
the display device according to claim 1; and
a control device, in which the rotation speed and feed speed of the feed axis are stored in advance, the control device having a function of generating feed commands for the intermittent cutting which is provided to the feed axis based on the rotation speed and the feed speed.

4. The machining system according to claim 3, further comprising a position detection device for detecting a position of the feed axis driven in accordance with the feed commands, wherein
the position detection device includes an encoder mounted on the feed axis or a position measuring device for remotely measuring the position of the tool.

5. A display device for displaying information related to a machine tool when performing intermittent cutting by oscillating a tool and a workpiece relative to each other in a machining feed direction in order to shred swarf generated when machining is performed, the machine tool performing machining through cooperation of a spindle for performing a relative rotation between the workpiece and the tool around a central axis of the workpiece, and a feed axis for performing a relative feeding between the tool and the workpiece in the machining feed direction, the display device comprising:

a position information acquisition part which acquires position information of the feed axis at predetermined intervals when intermittent cutting is performed;

a rotation information acquisition part which acquires a rotation angle of the spindle as rotation information of the spindle when intermittent cutting is performed;

a first waveform generation part which generates first waveform data representing a change of the position information of time series position information of the feed axis acquired by the position information acquisition part at the predetermined intervals according to the rotation angle;

a second waveform generation part which generates a plurality of second waveform data by dividing the first waveform data into partial waveform data by rotation angle per rotation and sequentially shifting each partial waveform data so as to match a start point of the first waveform data; and a waveform display part which displays the plurality of second waveform data, the display device further comprising:

a third waveform generation part which generates third waveform data by subtracting $n^{th}$ second waveform data (where n is a non-negative integer) from $(n+1)^{th}$ second waveform data, regarding each of the $n^{th}$ and $(n+1)^{th}$ waveform data obtained by dividing and shifting the first waveform data for each rotation angle per rotation; wherein the waveform display part displays the third waveform data instead of the plurality of second waveform data.

6. The display device according to claim 5, wherein the position information acquisition part acquires a feed command for the intermittent cutting applied to the feed axis or the position of the feed axis driven in accordance with the feed command as the position information of the feed axis.

7. A machining system, comprising:
the display device according to claim 5; and
a control device, in which the rotation speed and feed speed of the feed axis are stored in advance, the control device having a function of generating feed commands for the intermittent cutting which is provided to the feed axis based on the rotation speed and the feed speed.

8. The machining system according to claim 7, further comprising a position detection device for detecting a position of the feed axis driven in accordance with the feed commands, wherein
the position detection device includes an encoder mounted on the feed axis or a position measuring device for remotely measuring the position of the tool.

9. A machining system, comprising:
a display device for displaying information related to a machine tool when performing intermittent cutting by oscillating a tool and a workpiece relative to each other in a machining feed direction in order to shred swarf generated when machining is performed, the machine tool performing machining through cooperation of a spindle for performing a relative rotation between the workpiece and the tool around a central axis of the workpiece, and a feed axis for performing a relative feeding between the tool and the workpiece in the machining feed direction, the display device comprising:

a position information acquisition part which acquires position information of the feed axis at predetermined intervals when intermittent cutting is performed;

a rotation information acquisition part which acquires a rotation speed of the spindle as rotation information of the spindle when intermittent cutting is performed;

a first waveform generation part which generates first waveform data representing a change of the position information over time from time series position information of the feed axis acquired by the position information acquisition part at the predetermined intervals;

a second waveform generation part which generates a plurality of second waveform data by obtaining a rotation time per rotation from the rotation speed acquired by the rotation information acquisition part, dividing the first waveform data into partial waveform data for time per rotation, and sequentially shifting each partial waveform data in the time axis direction so as to match a start point of the first waveform data; and a waveform display part which displays the plurality of second waveform data;

a control device, in which the rotation speed and feed speed of the feed axis are stored in advance, the control device having a function of generating feed commands for the intermittent cutting which is provided to the feed axis based on the rotation speed and the feed speed; and a third waveform generation part which generates third waveform data by subtracting $n^{th}$ second waveform data (where n is a non-negative integer) from $(n+1)^{th}$ second waveform data, regarding each of the $n^{th}$ and $(n+1)^{th}$ waveform data obtained by dividing and shifting the first waveform data for time per rotation; wherein the waveform display part displays the third waveform data instead of the plurality of second waveform data.

10. The machining system according to claim 9, wherein the position information acquisition part acquires a feed command for the intermittent cutting applied to the feed axis or the position of the feed axis driven in accordance with the feed command as the position information of the feed axis.

11. A machining system, comprising:

a display device for displaying information related to a machine tool when performing intermittent cutting by oscillating a tool and a workpiece relative to each other in a machining feed direction in order to shred swarf generated when machining is performed, the machine tool performing machining through cooperation of a spindle for performing a relative rotation between the workpiece and the tool around a central axis of the workpiece, and a feed axis for performing a relative feeding between the tool and the workpiece in the machining feed direction, the display device comprising:

a position information acquisition part which acquires position information of the feed axis at predetermined intervals when intermittent cutting is performed;

a rotation information acquisition part which acquires a rotation angle of the spindle as rotation information of the spindle when intermittent cutting is performed;

a first waveform generation part which generates first waveform data representing a change of the position information of time series position information of the feed axis acquired by the position information acquisition part at the predetermined intervals according to the rotation angle;

a second waveform generation part which generates a plurality of second waveform data by dividing the first waveform data into partial waveform data by rotation angle per rotation and sequentially shifting each partial waveform data so as to match a start point of the first waveform data; and a waveform display part which displays the plurality of second waveform data;

a control device, in which the rotation speed and feed speed of the feed axis are stored in advance, the control device having a function of generating feed commands for the intermittent cutting which is provided to the feed axis based on the rotation speed and the feed speed; and a third waveform generation part which generates third waveform data by subtracting $n^{th}$ second waveform data (where n is a non-negative integer) from $(n+1)^{th}$ second waveform data, regarding each of the $n^{th}$ and $(n+1)^{th}$ waveform data obtained by dividing and shifting the first waveform data for each rotation angle per rotation; wherein the waveform display part displays the third waveform data instead of the plurality of second waveform data.

12. The machining system according to claim 11, wherein the position information acquisition part acquires a feed command for the intermittent cutting applied to the feed axis or the position of the feed axis driven in accordance with the feed command as the position information of the feed axis.

* * * * *